(12) United States Patent
Long et al.

(10) Patent No.: US 12,388,532 B2
(45) Date of Patent: Aug. 12, 2025

(54) DIRECT DIGITAL CHIRP SYNTHESIZER AND GENERATING A CHIRPED OPTICAL FREQUENCY COMB

(71) Applicant: Government of the United States of America, as represented by the Secretary of Commerce, Gaithersburg, MD (US)

(72) Inventors: David Alexander Long, Bethesda, MD (US); Benjamin James Reschovsky, Cabin John, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 290 days.

(21) Appl. No.: 18/035,896

(22) PCT Filed: Nov. 8, 2021

(86) PCT No.: PCT/US2021/058412
§ 371 (c)(1),
(2) Date: May 8, 2023

(87) PCT Pub. No.: WO2022/099112
PCT Pub. Date: May 12, 2022

(65) Prior Publication Data
US 2024/0014903 A1    Jan. 11, 2024

Related U.S. Application Data

(60) Provisional application No. 63/110,678, filed on Nov. 6, 2020.

(51) Int. Cl.
*H04B 10/00* (2013.01)
*H04B 10/50* (2013.01)
(Continued)

(52) U.S. Cl.
CPC ........ *H04B 10/504* (2013.01); *H04B 10/508* (2013.01); *H04B 10/556* (2013.01)

(58) Field of Classification Search
CPC .......................... H04B 10/548; G02F 2203/56
See application file for complete search history.

(56) References Cited

U.S. PATENT DOCUMENTS

2017/0261832 A1* 9/2017 Cingoz ................. H01S 3/1304
2019/0028203 A1* 1/2019 Kuse ......................... G02F 3/00

OTHER PUBLICATIONS

Long, D.A., et al., "Multiplexed sub-Doppler spectroscopy with an optical frequency comb", Physical Review A, 2016, p. 061801, vol. 94.

(Continued)

*Primary Examiner* — Daniel G Dobson
(74) *Attorney, Agent, or Firm* — Office of Chief Counsel for National Institute of Standards and Technology

(57) ABSTRACT

Disclosed is a direct digital chirp synthesizer for generating a chirped optical frequency comb that includes: a direct digital synthesizer that receives a repetition frequency signal from a delay generator, receives a clock frequency from a frequency converter, produces a radiofrequency chirp waveform based on the repetition frequency signal and the clock frequency, and communicates the radiofrequency chirp waveform; and an electro optic modulator in electrical communication with the direct digital synthesizer and that receives the radiofrequency chirp waveform from the direct digital synthesizer, receives laser light, and produces the chirped optical frequency comb from the laser light based on the radiofrequency chirp waveform.

20 Claims, 9 Drawing Sheets

(51) Int. Cl.
*H04B 10/508* (2013.01)
*H04B 10/556* (2013.01)
*H04J 14/00* (2006.01)

(56) References Cited

OTHER PUBLICATIONS

Park, G.B., et al., "Perspective: The first ten years of broadband chirped pulse Fourier transform microwave spectroscopy", The Journal of Chemical Physics, 2016, p. 200901, vol. 144.
Hebert, N.B., et al., "Self-heterodyne interference spectroscopy using a comb generated by pseudo-random modulation", Optics Express, 2015, p. 27806-27818, vol. 23 No. 21.
Finneran, I.A., et al., "A direct digital synthesis chirped pulse Fourier transform microwave spectrometer", Review of Scientific Instruments, 2013, p. 083104, vol. 84.
Long, D.A., et al., "Electro-optic frequency combs generated via direct digital synthesis applied to sub-Doppler spectroscopy", OSA Continuum, 2019, p. 3576-3583, vol. 2 No. 12.
International Search Report from PCT/US2021/058412 file date Nov. 8, 2021.

\* cited by examiner

DIRECT DIGITAL CHIRP SYNTHESIZER AND GENERATING A CHIRPED OPTICAL FREQUENCY COMB

CROSS REFERENCE TO RELATED APPLICATIONS

This application claims the benefit of U.S. Provisional Patent Application Ser. No. 63/110,678 (filed Nov. 6, 2020), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a direct digital chirp synthesizer for generating a chirped optical frequency comb, the direct digital chirp synthesizer comprising: a direct digital synthesizer that receives a repetition frequency signal from a delay generator, receives a clock frequency from a frequency converter, produces a radiofrequency chirp waveform based on the repetition frequency signal and the dock frequency, and communicates the radiofrequency chirp waveform; and an electro optic modulator in electrical communication with the direct digital synthesizer and that receives the radiofrequency chirp waveform from the direct digital synthesizer, receives laser light, and produces the chirped optical frequency comb from the laser light based on the radiofrequency chirp waveform.

Disclosed is a chirped optical frequency comb spectrometer for performing optical spectroscopy, the chirped optical frequency comb spectrometer comprising: a direct digital chirp synthesizer that comprises: a direct digital synthesizer that receives a repetition frequency signal from a delay generator, receives a dock frequency from a frequency converter, produces a radiofrequency chirp waveform based on the repetition frequency signal and the dock frequency, and communicates the radiofrequency chirp waveform; and an electro optic modulator in electrical communication with the direct digital synthesizer and that: receives the radiofrequency chirp waveform from the direct digital synthesizer; receives laser light; and produces a chirped optical frequency comb from the laser light based on the radiofrequency chirp waveform; and a spectroscopy cell in optical communication with the electro optic modulator and that receives a frequency shifted optical comb based on the chirped optical frequency comb and produces an optical spectrum from the frequency shifted optical comb.

Disclosed is a process for generating a chirped optical frequency comb with a direct digital chirp synthesizer, the process comprising: receiving, by a direct digital synthesizer, a repetition frequency signal from a delay generator; receiving, by the direct digital synthesizer, a clock frequency from a frequency converter; producing, by the direct digital synthesizer, a radiofrequency chirp waveform based on the repetition frequency signal and the clock frequency; communicating the radiofrequency chirp waveform from the direct digital synthesizer; receiving, by an electro optic modulator, the radiofrequency chirp waveform from the direct digital synthesizer; receiving, by the electro optic modulator, laser light; and producing, by the electro optic modulator, the chirped optical frequency comb from the laser light based on the radiofrequency chirp waveform.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
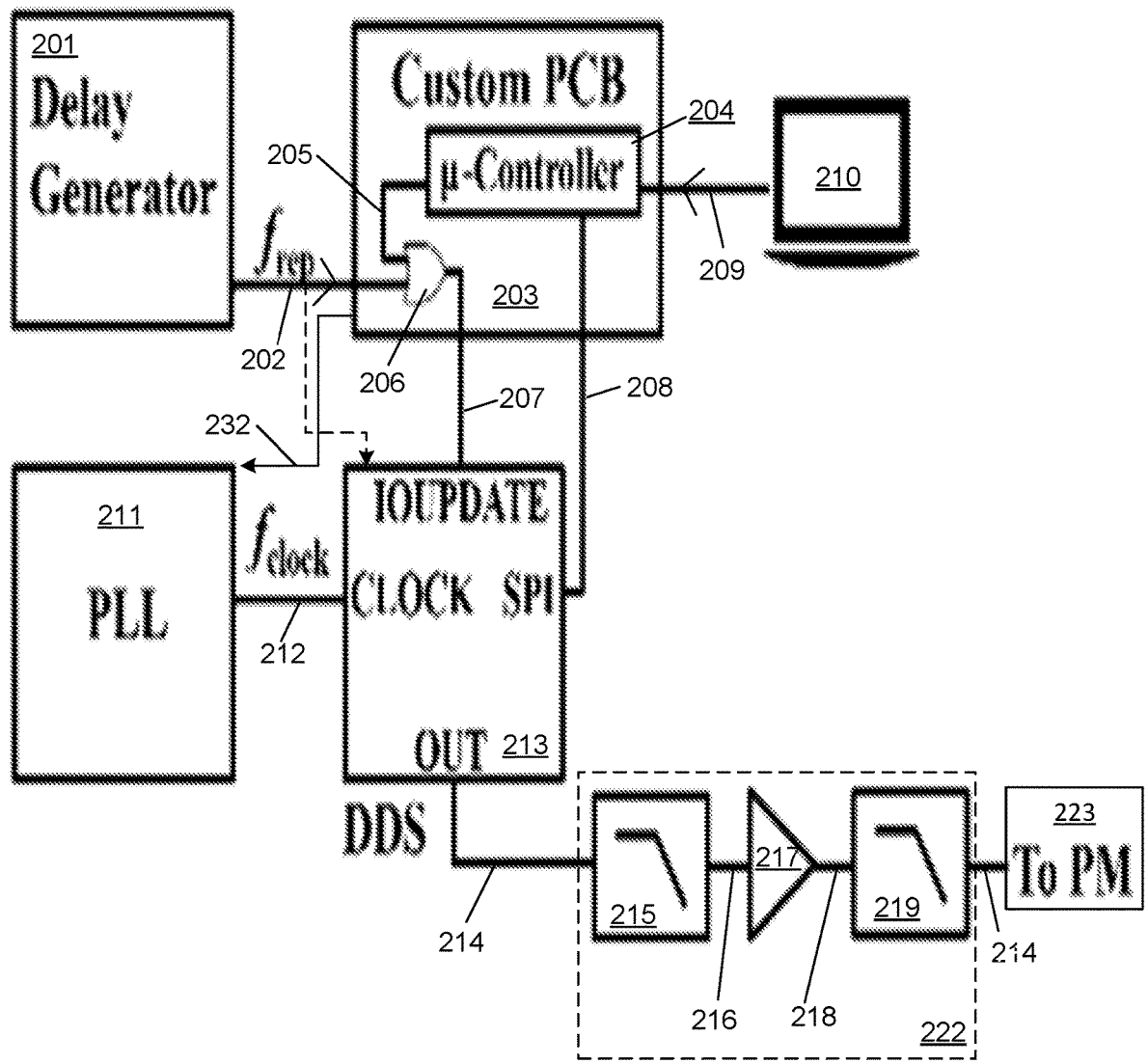
FIG. 1 shows a direct digital chirp synthesizer, according to some embodiments, wherein a low jitter digital gate delay generator can control the chirp repetition rate ($f_{rep}$).

A detailed description of one or more embodiments is presented herein by way of exemplification and not limitation.

Optical frequency combs have had a significant and continuing impact on a range of technologies. Optical frequency combs provide the capability to link coherently optical signals separated by arbitrarily large frequency differences and to link optical frequencies to radio frequencies. Interest in optical frequency combs started with applications in optical frequency metrology, e.g., making absolute measurement of the frequency of light and the inverse problem of developing optical atomic clocks. A steady expansion in applications of optical frequency combs has occurred, including development of dual comb spectroscopy, which can yield higher resolution faster and in smaller package than traditional methods, and coherent communications.

Generally, a frequency comb generator produces a spectrum that includes serially spaced sharp lines with known frequencies. There are various types of comb generators such as an optical frequency generator, vector signal generator, analog signal generator, function generator, and arbitrary waveform generator. A frequency comb generator can be a signal generator that can be a component of electronic equipment that emits a regular pattern of signals. A pulse tram generated by a laser can have a frequency spectrum that includes a discrete, regularly spaced series of sharp lines that establishes an optical frequency comb, but this can be more complex than other types of signal generators and can operate with microwave frequencies that are extremely sensitive to environmental conditions that can affect the stability of the frequency spectrum.

A limitation of some conventional optical frequency comb systems is that components used to produce the comb can be bulky and expensive. Conventional systems produce optical frequency combs with defects associated with frequency comb generation bandwidth, pitch, spectral purity and spectral equalization. Moreover, conventional optical frequency comb generation can suffer from immense power dissipation and large-scale component use of an array of lasers with complex optical setups and high cost. Additional conventional approaches have relied upon arbitrary waveform generators (AWGs) to produce waveforms at a high cost, power consumption, and size with limited frequency agility due to transferring long radiofrequency sequences that are rapidly sampled.

The direct digital chirp synthesizer described here overcomes these technical limitations and provides a radiofrequency chirp waveform that is used to produce a chirped optical frequency comb. The direct digital chirp synthesizer provides an unprecedented degree of control over operational parameters, providing for digital control over span, comb tooth spacing, and central frequency of the chirped optical frequency comb. With waveguide-based electro-optic modulators, the comb tooth spacing is independent of a laser cavity length and can therefore be made essentially arbitrarily narrow. As a result, the chirped optical frequency comb can be produced with mode spacings more than six orders of magnitude denser than with a conventional mode-locked-laser-based optical frequency comb. This ultra-dense tooth spacing can be used for elucidating narrow sub-Doppler features in atomic and molecular systems.

Direct digital chirp synthesizer 200 generates a chirped optical frequency comb. In an embodiment, with reference to FIG. 1, direct digital chirp synthesizer 200 includes: a direct digital synthesizer 213 that receives a repetition frequency signal 202 from a delay generator 201, receives a clock frequency 212 from a frequency converter 211, produces a radiofrequency chirp waveform 214 based on the repetition frequency signal 202 and the clock frequency 212, and communicates the radiofrequency chirp waveform 214; and an electro optic modulator 223 in electrical communication with the direct digital synthesizer 213 and that receives the radiofrequency chirp waveform 214 from the direct digital synthesizer 213, receives laser light 221, and produces the chirped optical frequency comb 224 from the laser light 221 based on the radiofrequency chirp waveform 214.

In an embodiment, direct digital chirp synthesizer 200 further includes the frequency converter 211 (e.g., a phase-locked loop) in electrical communication with the direct digital synthesizer 213 and that produces the clock frequency 212 and communicates the clock frequency 212 to the direct digital synthesizer 213. In some embodiments, frequency converter 211 receives clock frequency setting 232 from programmer 203 and used dock frequency setting 232 to produce dock frequency 212.

In an embodiment, direct digital chirp synthesizer 200 further includes the delay generator 201 in electrical communication with the direct digital synthesizer 213 and that produces the repetition frequency signal 202 and communicates the repetition frequency signal 202. In an embodiment, direct digital chirp synthesizer 200 further includes programmer 203 in electrical communication with the delay generator 201 and the direct digital synthesizer 213, the programmer 203 including: a microcontroller 204; and a logic gate 206 in electrical communication with the microcontroller 204 and the delay generator 201, wherein: the microcontroller 204 receives a configuration signal 209 and produces a program signal 205 and DDS setting data 208 based on the configuration signal 209, wherein the DDS setting data 208 is communicated to and received by the direct digital synthesizer 213 to set operational parameters of the direct digital synthesizer 213; and the logic gate 206 receives the repetition frequency signal 202 from the delay generator 201 and the program signal 205 from the microcontroller 204, and produces a logic signal 207 that includes the program signal 205 to program the direct digital synthesizer 213 or the repetition frequency signal 202 to update the direct digital synthesizer 213, such that the logic signal 207 is communicated to and received by the direct digital synthesizer 213 for producing the radiofrequency chirp waveform 214. In an embodiment, direct digital chirp synthesizer 200 further includes configuration unit 210 in electrical communication with the programmer 203 and that produces the configuration signal 209 and communicates the configuration signal 209 to the microcontroller 204. It is contemplated that delay generator 201 can directly send repetition frequency signal 202 to direct digital synthesizer 213 as an alternative to inclusion of programmer 203. Moreover, it should be appreciated that direct digital synthesizer 213 can be programmed using external signal (e.g., logic signal 207, DDS setting data 208, and the like) or can be self-programmed to include appropriate settings and functionality to produce a selectively tailored radiofrequency chirp waveform 214.

In an embodiment, direct digital chirp synthesizer 200 further includes signal conditioning module 222 in electrical communication with the direct digital synthesizer 213 and that receives the radiofrequency chirp waveform 214 from the direct digital synthesizer 213, electrically conditions the radiofrequency chirp waveform 214, and then communicates the radiofrequency chirp waveform 214 to the electro optic modulator 223 after performing the conditioning. In an embodiment, signal conditioning module 222 includes: a low pass filter 215 in electrical communication with the direct digital synthesizer 213 that receives the radiofrequency chirp waveform 214 from the direct digital synthesizer 213, filters the radiofrequency chirp waveform 214, and produces an intermediate RF chirp waveform 216 from the radiofrequency chirp waveform 214; an amplifier 217 in electrical communication with the low pass filter 215 that receives the intermediate RF chirp waveform 216 from the low pass filter 215, amplifies the intermediate RF chirp waveform 216, and produces an amplified intermediate RF chirp waveform 218 from the intermediate RF chirp waveform 216; and a low pass filter 219 in electrical communication with the amplifier 217 that receives the intermediate RF chirp waveform 218 from the amplifier 217, filters the intermediate RF chirp waveform 218, produces the radiofrequency chirp waveform 214 from the intermediate RF chirp waveform 218, and communicates the radiofrequency chirp waveform 214 to the electro optic modulator 223.

Figure 2:
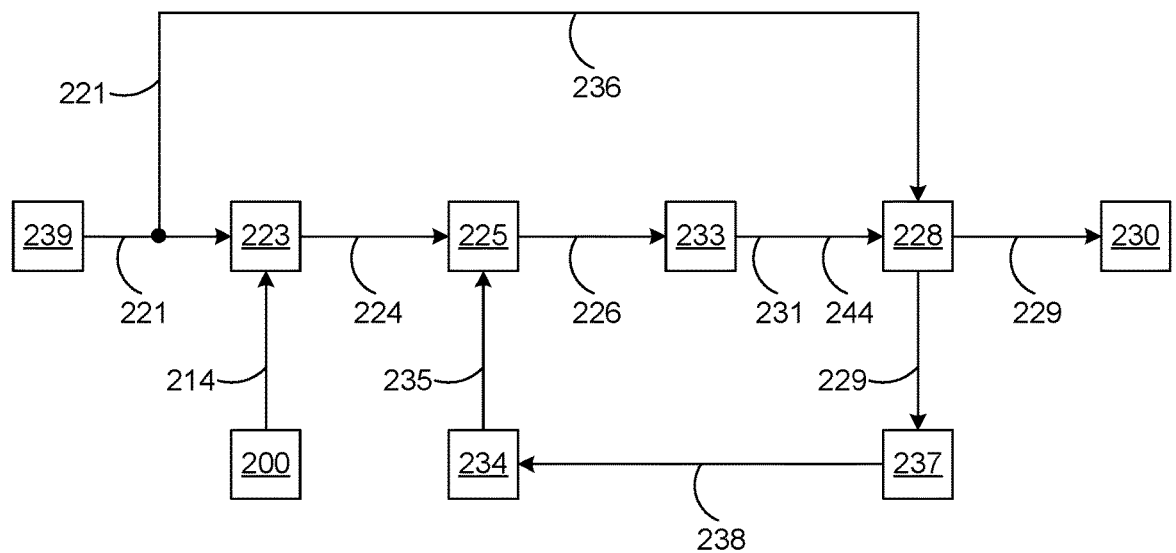
FIG. 2 shows a chirped optical frequency comb spectrometer, according to some embodiments.
Figure 3:
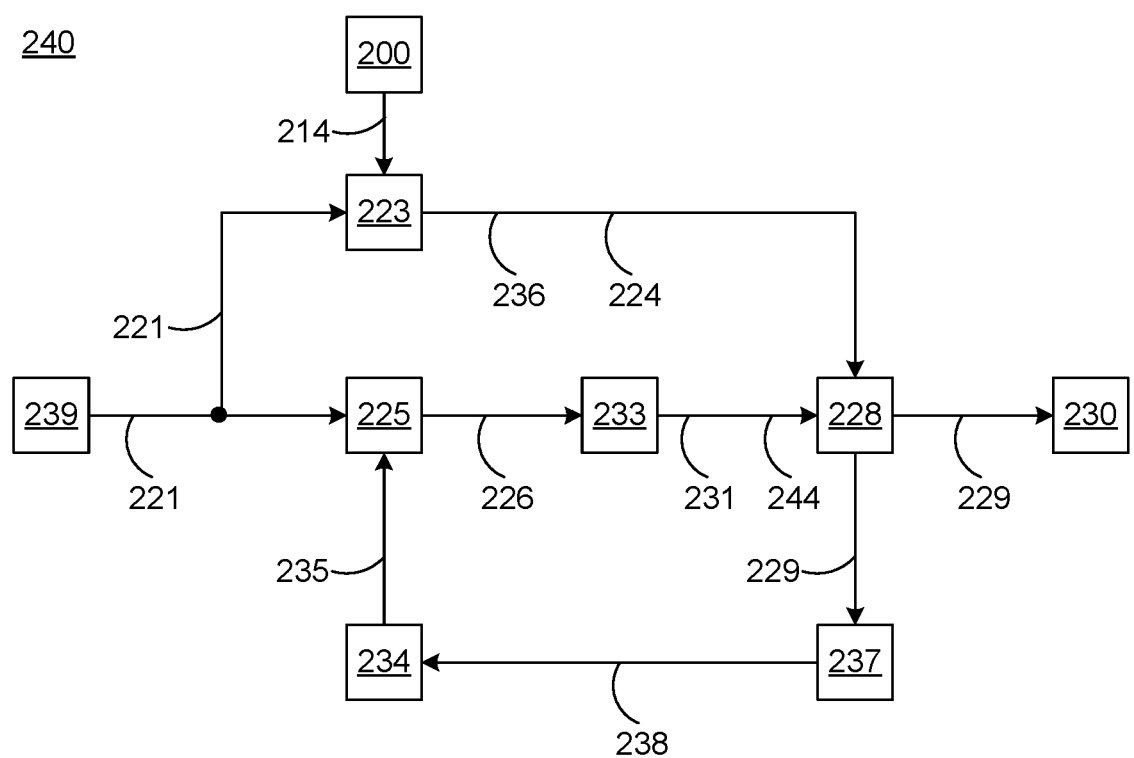
FIG. 3 shows a chirped optical frequency comb spectrometer, according to some embodiments.

Direct digital chirp synthesizer 200 can be used as a source for spectroscopy, e.g., for performing optical spectroscopy. In an embodiment, with reference to FIG. 2, FIG. 3, and FIG. 4, chirped optical frequency comb spectrometer 240 for performing optical spectroscopy includes: direct digital chirp synthesizer 200 that includes: a direct digital synthesizer 213 that receives a repetition frequency signal 202 from a delay generator 201, receives a clock frequency 212 from a frequency converter 211, produces a radiofrequency chirp waveform 214 based on the repetition frequency signal 202 and the clock frequency 212, and communicates the radiofrequency chirp waveform 214; and an electro optic modulator 223 in electrical communication with the direct digital synthesizer 213 and that: receives the radiofrequency chirp waveform 214 from the direct digital synthesizer 213; receives laser light 221; and produces a chirped optical frequency comb 224 from the laser light 221 based on the radiofrequency chirp waveform 214; and a spectroscopy cell 233 in optical communication with the electro optic modulator 223 and that receives a frequency shifted optical comb 226 based on the chirped optical frequency comb 224 and produces an optical spectrum 231 from the frequency shifted optical comb 226.

In an embodiment of chirped optical frequency comb spectrometer 240, direct digital chirp synthesizer 200 further includes the frequency converter 211 in electrical communication with the direct digital synthesizer 213 and that produces the clock frequency 212 and communicates the clock frequency 212 to the direct digital synthesizer 213. The chirped optical frequency comb spectrometer 240 can include the delay generator 201 in electrical communication with the direct digital synthesizer 213 to produce the repetition frequency signal 202 and communicates the repetition frequency signal 202 to the direct digital synthesizer 213. Programmer 203 is in electrical communication with the delay generator 201 and the direct digital synthesizer 213. The programmer 203 can include: a microcontroller 204; and a logic gate 206 in electrical communication with the microcontroller 204 and the delay generator 201, wherein: the microcontroller 204 receives a configuration signal 209 and produces a program signal 205 and DDS setting data 208 based on the configuration signal 209, wherein the DDS setting data 208 is communicated to and received by the direct digital synthesizer 213 to set operational parameters of the direct digital synthesizer 213; and the logic gate 206 receives the repetition frequency signal 202 from the delay generator 201 and the program signal 205 from the microcontroller 204, and produces a logic signal 207 that includes the program signal 205 to program the direct digital synthesizer 213 or the repetition frequency signal 202 to update the direct digital synthesizer 213, such that the logic signal 207 is communicated to and received by the direct digital synthesizer 213 for producing the radiofrequency chirp waveform 214. Configuration unit 210 is in electrical communication with the programmer 203 and that produces the configuration signal 209 and communicates the configuration signal 209 to the microcontroller 204. Signal conditioning module 222 is in electrical communication with the direct digital synthesizer 213 and receives the radiofrequency chirp waveform 214 from the direct digital synthesizer 213, electrically conditions the radiofrequency chirp waveform 214, and then communicates the radiofrequency chirp waveform 214 to the electro optic modulator 223 after performing the conditioning. Signal conditioning module 222 can include low pass filter 215 in electrical communication with the direct digital synthesizer 213 that receives the radiofrequency chirp waveform 214 from the direct digital synthesizer 213, filters the radiofrequency chirp waveform 214, and produces an intermediate RF chirp waveform 216 from the radiofrequency chirp waveform 214; an amplifier 217 in electrical communication with the low pass filter 215 that receives the intermediate RF chirp waveform 216 from the low pass filter 215, amplifies the intermediate RF chirp waveform 216, and produces an amplified intermediate RF chirp waveform 218 from the intermediate RF chirp waveform 216; and a low pass filter 219 in electrical communication with the amplifier 217 that receives the intermediate RF chirp waveform 218 from the amplifier 217, filters the intermediate RF chirp waveform 218, produces the radiofrequency chirp waveform 214 from the intermediate RF chirp waveform 218, and communicates the radiofrequency chirp waveform 214 to the electro optic modulator 223.

In an embodiment, chirped optical frequency comb spectrometer 240 further includes laser 239 in optical communication with the electro optic modulator 223 and that produces the laser light 221, communicates the laser light 221 that is received by the electro optic modulator 223. Local oscillator leg 236 is in optical communication with the laser 239 and receives the laser light 221 from the laser 239 and communicates the laser light 221 to a heterodyne detector 228. Heterodyne detector 228 is in optical communication with the spectroscopy cell 233 and the local oscillator leg 236, receives the laser light 221 from the local oscillator leg 236, receives the optical spectrum 231 from the spectroscopy cell 233, and produces a radiofrequency interferogram 229 from the laser light 221 and the optical spectrum 231.

In chirped optical frequency comb spectrometer 240, phase frequency detector 237 is in in communication with the heterodyne detector 228, receives the radiofrequency interferogram 229 from the heterodyne detector 228, produces a phase drift control signal 238 from the radiofrequency interferogram 229, and communicates the phase drift control signal 238 to a voltage controlled oscillator 234. Voltage controlled oscillator 234 is in communication with the phase frequency detector 237, receives the phase drift control signal 238 from the radiofrequency interferogram 229, produces a drive frequency 235 from the phase drift control signal 238, and communicates the drive frequency 235 to an acousto optical modulator 225. Acousto optical modulator 225 is in communication with the voltage controlled oscillator 234, the electro optic modulator 223, and the spectroscopy cell 233 and receives the drive frequency 235 from the voltage controlled oscillator 234, receives the chirped optical frequency comb 224 from the electro optic modulator 223, produces the frequency shifted optical comb 226 from the chirped optical frequency comb 224 based on the drive frequency 235, and communicates the frequency shifted optical comb 226 to the spectroscopy cell 233.

The chirped optical frequency comb spectrometer 240 can include magnetic shielding 242 in which the spectroscopy cell 233 is disposed. Magnetic shielding 242 shields spectroscopy cell 233 from electromagnetic interference. Additionally, spectroscopy cell 233 can be disposed in oven 241 for thermally stabilizing or achieving a desired temperature of spectroscopy cell 233 and chemical analyte 243 disposed in spectroscopy cell 233. Chemical analyte 243 can be a selected chemical compound or composition that can include atoms, molecules, radicals, ions, and the like in a fluid state such as a gas or a liquid.

Direct digital chirp synthesizer 200 and chirped optical frequency comb spectrometer 240 can be made of various elements and components that provide efficient generation and communication of electrical and optical signals. For optical components, coatings and materials used can be selected for operation with laser wavelengths that can include visible light from 400 nm to 700 nm, near infrared light from 700 nm to 1000 nm, or short-wave infrared from 1000 nm to 3000 nm. Operation with selected laser wavelengths can provide integration with a large number of fiber optic components designed for various applications such as telecommunications, making direct digital chirp synthesizer 200 and chirped optical frequency comb spectrometer 240 scalable and compatible with off-the-shelf optical characterization tools.

Elements of direct digital chirp synthesizer 200 and chirped optical frequency comb spectrometer 240 can be made of materials that are physically or chemically resilient in an environment in which direct digital chirp synthesizer 200 and chirped optical frequency comb spectrometer 240 are disposed. Exemplary materials include a metal, ceramic, thermoplastic, glass, semiconductor, and the like. The elements of direct digital chirp synthesizer 200 and chirped optical frequency comb spectrometer 240 can be made of the same or different material and can be monolithic in a single physical body or can be separate members that are physically joined. Transmission of a selected wavelength of light can occur in free space or propagation through a condensed medium such a fiber optic or through optical windows, polarizers, and the like made of a material suitable for optical transmission at wavelengths included, e.g., in chirped optical frequency comb 224.

Direct digital chirp synthesizer 200 and chirped optical frequency comb spectrometer 240 can be made in various ways. It should be appreciated that direct digital chirp synthesizer 200 and chirped optical frequency comb spectrometer 240 include a number of optical, electrical, or mechanical components, wherein such components can be interconnected and placed in communication (e.g., optical communication, electrical communication, mechanical communication, fluid communication, and the like) by electrical, physical, chemical, optical, or free-space interconnects. The components can be disposed on mounts that can be disposed on a bulkhead for alignment or physical compartmentalization. As a result, direct digital chirp synthesizer 200 and chirped optical frequency comb spectrometer 240 can be disposed in a terrestrial environment or space environment. Elements of direct digital chirp synthesizer 200 and chirped optical frequency comb spectrometer 240 can be formed from suitable materials such as semiconductor, ceramic, glass, metal, and the like. Moreover, elements of direct digital chirp synthesizer 200 and chirped optical frequency comb spectrometer 240 can be formed using custom additive or subtractive manufacturing as well as interconnection of commercially available components. Moreover, elements of direct digital chirp synthesizer 200 and chirped optical frequency comb spectrometer 240 can be formed using integrated photonic fabrication techniques and incorporated on a photonic integrated circuit.

Direct digital chirp synthesizer 200 has numerous advantageous and unexpected benefits and uses. In an embodiment, a process for generating a chirped optical frequency comb with direct digital chirp synthesizer 200 includes: receiving, by a direct digital synthesizer 213, a repetition frequency signal 202 from a delay generator 201; receiving, by the direct digital synthesizer 213, a clock frequency 212 from a frequency converter 211; producing, by the direct digital synthesizer 213, a radiofrequency chirp waveform 214 based on the repetition frequency signal 202 and the clock frequency 212; communicating the radiofrequency chirp waveform 214 from the direct digital synthesizer 213; receiving, by an electro optic modulator 223, the radiofrequency chirp waveform 214 from the direct digital synthesizer 213; receiving, by the electro optic modulator 223, laser light 221; and producing, by the electro optic modulator 223, the chirped optical frequency comb 224 from the laser light 221 based on the radiofrequency chirp waveform 214.

The process for generating the chirped optical frequency comb also can include: producing, by the frequency converter 211, the clock frequency 212; communicating the clock frequency 212 from the frequency converter 211 to the direct digital synthesizer 213; producing, by the delay generator 201, the repetition frequency signal 202; communicating the repetition frequency signal 202 from the delay generator 201; a programmer 203 in electrical communication with the delay generator 201 and the direct digital synthesizer 213, the programmer 203 including: a microcontroller 204; and a logic gate 206 in electrical communication with the microcontroller 204 and the delay generator 201, wherein: receiving, by a microcontroller 204, a configuration signal 209 and producing a program signal 205 and DDS setting data 208 based on the configuration signal 209, and communicating the DDS setting data 208 to the direct digital synthesizer 213; setting operational parameters of the direct digital synthesizer 213 based on the DDS setting data 208; receiving, by a logic gate 206, the repetition frequency signal 202 from the delay generator 201 and the program signal 205 from the microcontroller 204, and producing a logic signal 207 that includes the program signal 205 or the repetition frequency signal 202; programming the direct digital synthesizer 213 with the program signal 205; updating the direct digital synthesizer 213 with the repetition frequency signal 202; producing, by a configuration unit 210, a configuration signal 209, communicating the configuration signal 209 to the microcontroller 204 from the configuration unit 210, and configuring the microcontroller 204 with the configuration signal 209; and producing the radiofrequency chirp waveform 214 by the direct digital synthesizer 213.

Direct digital chirp synthesizer 200 and processes disclosed herein have numerous beneficial uses. Beneficially, direct digital chirp synthesizer 200 overcomes limitations and technical deficiencies of conventional devices and conventional processes. It should be appreciated that direct digital chirp synthesizer 200 can be a chip-based direct digital synthesizer to produce linear frequency chirps in radiofrequency chirp waveform 214. Radiofrequency chirp waveform 214 drives electro optic modulator 223 that produces chirped optical frequency comb 224. Advantageously, using direct digital synthesizer 213 to produce chirped optical frequency comb 224 provides lower cost and power consumption than conventional technology such as arbitrary waveform generators. Further advantages provided by direct digital chirp synthesizer 200 include the ability to easily tune the optical frequency comb span, and spacing and the ability to perform coherent averaging. Indeed, a direct digital synthesizer 213 can generate a linear frequency chirp instead of an arbitrary waveform generator, which is typically large and expensive and that can involve a lengthy data upload procedure.

Chip-based direct digital synthesizer 213 produces linear frequency chirps that creates extremely flat and frequency-agile optical frequency combs 224 that can be used in measurements such as molecular and atomic spectroscopy as well as physical metrology for applications such as pressure, temperature, vibration, sound, ultrasound, and the like. Radiofrequency chirp waveform 214 does not require transfer of large time records that can limit the frequency agility and flexibility of conventional methods. Further, coherent operation and coherent averaging provided by radiofrequency chirp waveform 214 allow for facile averaging.

The articles and processes herein are illustrated further by the following Example, which is non-limiting.

EXAMPLE

Electro-Optic Frequency Combs Generated Via Direct Digital Synthesis Applied to Sub-Doppler Spectroscopy Direct digital synthesis in concert with an electro-optic phase modulator generated optical frequency combs with tooth spacings as low as 100 Hz. These combs were used to probe electromagnetically induced transparency (EIT) and hyperfine pumping in potassium vapor cells. Long-term coherent averaging was demonstrated with performance similar to that achieved with a much more expensive arbitrary waveform generator. From the potassium EIT transition, the ground state hyperfine splitting was determined with a fit uncertainty of 80 Hz. Because of the mutual coherence between the control and probe beams, which originated from a single laser, features with linewidths several orders-of-magnitude narrower than the laser linewidth were observed in a multiplexed fashion. This approach removes the need for slow scanning of a conventional cw laser or mode-locked-laser-based optical frequency comb.

Figure 5:
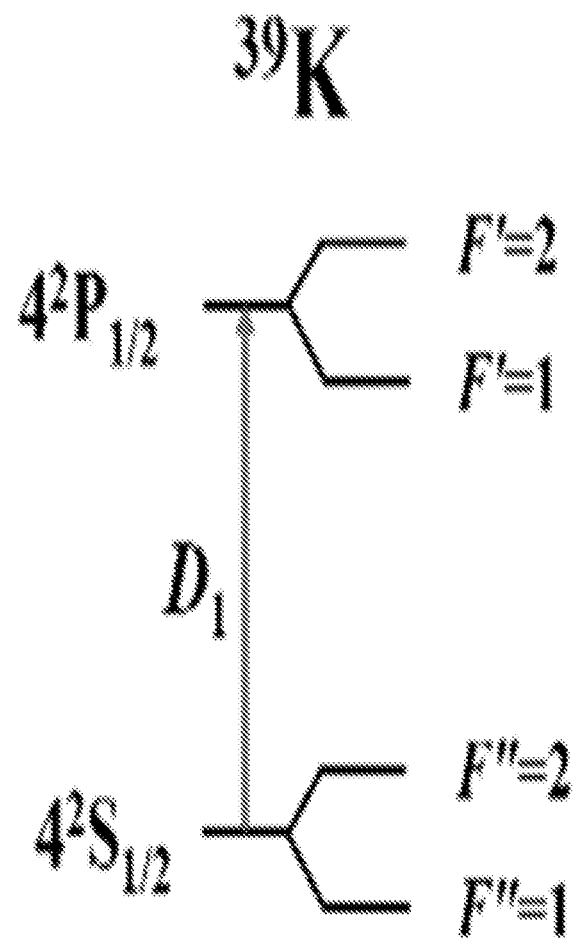
FIG. 5 shows, according to the Example, an energy level diagram for $^{39}K$, wherein upper state $4^2P_{1/2}$ splitting is 55.5 MHz, and lower state $4^2S_{1/2}$ splitting is 461.7 MHz.

These combs allow for multiplexed, sub-Doppler spectroscopy, wherein the entire spectrum can be acquired in a single interferogram, removing the need for slow spectral interleaving. Potassium transitions in the near-infrared region were used in probing ultranarrow electromagnetically induced transparency (EIT) features in vacuum and buffer gas cells. FIG. 5 shows an energy level diagram for electronic states of potassium used here. This approach enables the interrogation of features that were as narrow as 1 kHz, which is narrower than the initial laser linewidth and the width of an individual comb line.

Figure 4:
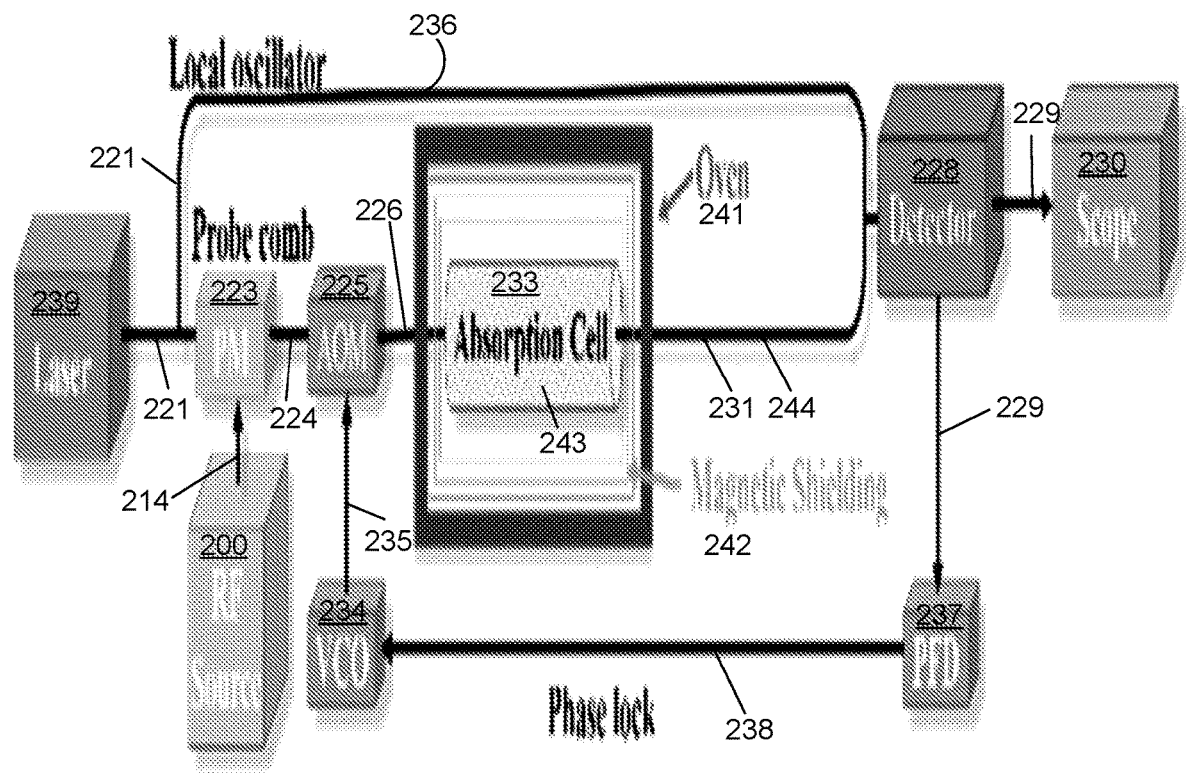
FIG. 4 shows a chirped optical frequency comb spectrometer, according to the Example, wherein a probe laser is divided into probe and local oscillator legs in a self-heterodyne configuration. The probe comb is generated by an electro-optic phase modulator (PM) driven with an RF source (e.g., either an arbitrary waveform generator or a direct digital synthesizer). An acousto-optic modulator (AOM) is used to separate the positive and negative order comb teeth in the resulting interferogram and as an actuator for the phase lock. This phase lock (using a phase-frequency detector, PFD, and voltage-controlled oscillator, VCO) cancels out thermal and mechanical fluctuations between the probe and local oscillator legs and allows for coherent averaging.

The optical configuration included a self-heterodyne configuration as shown in FIG. 4. The laser source was a fiber-coupled, external-cavity diode laser (ECDL) with an estimated linewidth of 50 kHz to 200 kHz at 5 µs and a wavelength range of 758.9 nm to 790.5 nm. The wavelength was set near 770.1 nm to probe $D_1$ transition of $^{39}$K. The laser was split into probe leg 244 and local oscillator leg 236, with the probe path passed through a waveguide-based electro-optic phase modulator (PM) 223 for comb generation. PM 223 was driven by repeated, linear frequency chirps generated by either an AWG or a DDS. The AWG had a maximum bandwidth of 5 GHz and operated at 12-bit vertical resolution. AWG sampling rates between $1.5 \times 10^9$ samples per second and $1 \times 10^{10}$ samples per second were employed for these measurements.

DDS electronics included an evaluation board containing a high-speed, 12-bit DDS chip. Communication with the DDS chip was performed using a microcontroller (p-controller) and a serial peripheral interface (SPI) (FIG. 1). DDS 213 was programmed to start a new frequency chirp upon receiving a trigger from delay generator 201. A separate phase-locked-loop (PLL) circuit 211 provided the clock signal 212 for DDS 213 at either 3.6 GHz or 3.75 GHz. PLL 211 and delay generator 201 were both referenced to the same 10 MHz clock signal that was used to stabilize oscilloscope 230, ensuring that each piece of equipment shared a common time base. The DDS output was filtered by signal conditioning module 222 to avoid aliased signals above the Nyquist frequency and the amplitude was adjusted to match that of the AWG.

Figure 6:
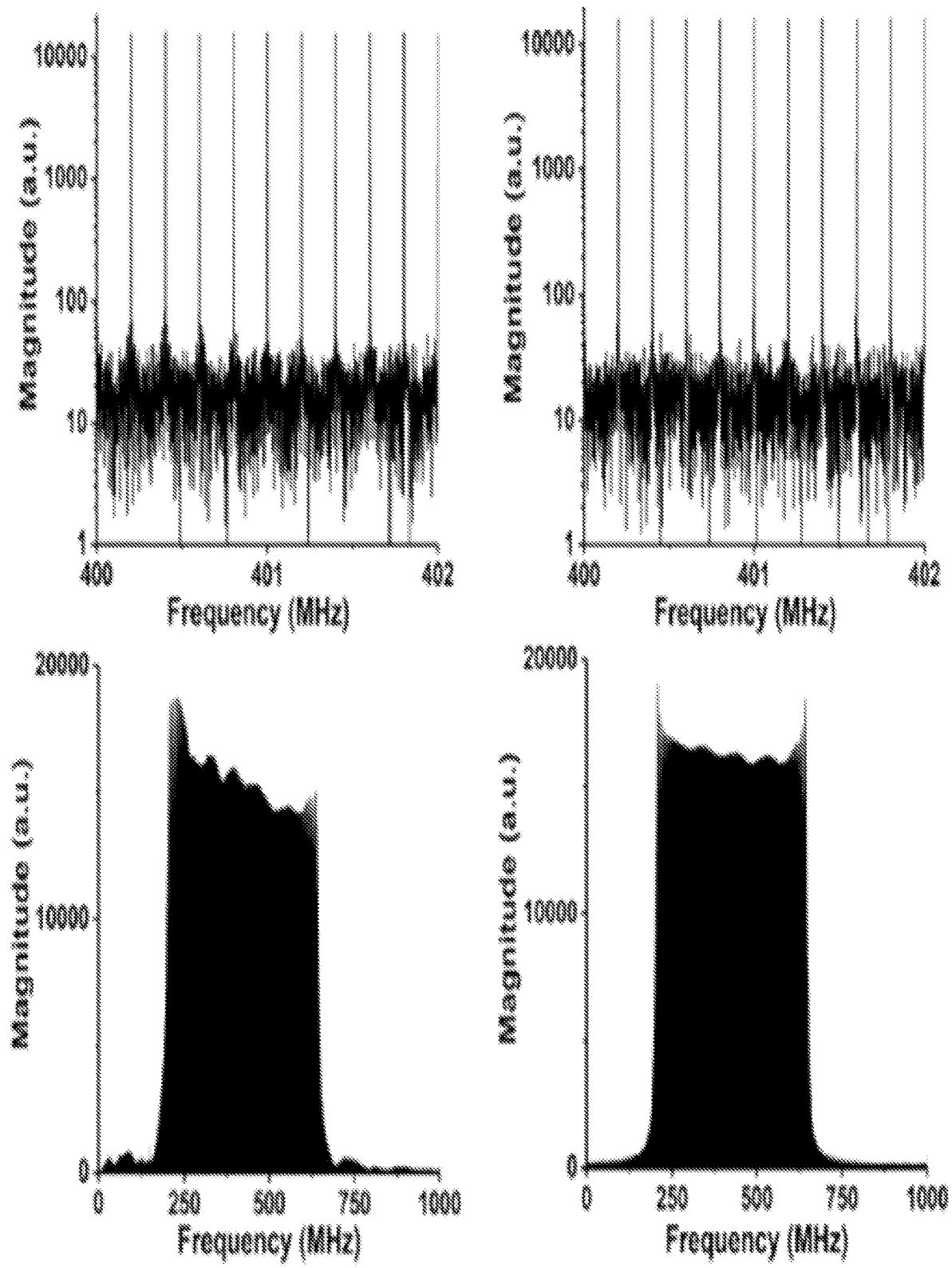
FIG. 6 shows, according the Example, (lower panels) a magnitude of the Fourier transform of typical radiofrequency outputs from the direct digital synthesizer (left) and arbitrary waveform generator (right). Each trace contained $5 \times 10^6$ samples recorded at $5 \times 10^9$ samples per second. The resulting radiofrequency combs span 200 MHz to 650 MHz with a spacing of 200 kHz. (Upper panels) These panels give a zoomed-in-view. The relative standard deviations of the shown 11 comb teeth are 1.4% (left) and 1.0% (right).

A comparison of the radiofrequency outputs generated by the AWG and DDS can be found in FIG. 6. Both devices produce exceptionally flat radiofrequency combs with transform-limited comb tooth widths. In the central region of the combs between 250 MHz and 600 MHz, the relative standard deviations of the comb teeth amplitudes are just 6.4% for the DDS and 1.9% for the AWG. The DDS comb flatness is slightly degraded by the external RF amplifier that is necessary to match the amplitude of the AWG. Removing this amplifier and one of the low pass filters improves the relative standard deviation of the DDS comb to 4.1%. Normalization leads to similar spectroscopic signal-to-noise ratios.

An acousto-optic modulator (AOM) 225 was employed to ensure that the positive- and negative-order comb teeth occurred at unique frequencies in the RF spectrum of the photodetector 228. After being launched into free space, the probe beam was expanded to a $1/e^2$ diameter which was varied between 2 mm and 6 mm over the course of these measurements and made circularly polarized (which can lead to larger cross sections) before being sent into an atomic vapor absorption cell 233.

Two separate absorption cells were used during these measurements. The first was an evacuated cell 25 cm long with a diameter of 2.54 cm and contained potassium vapor 243 at natural isotopic abundance. The second cell was 7.5 cm in length with a diameter of 2.54 cm and contained potassium vapor 243 at natural isotopic abundance as well as 2.67 kPa of argon. Millions of collisions of the absorber with a buffer gas can occur before loss of coherence, thus leading to a dramatic reduction of transit time broadening. Stray magnetic fields that otherwise could affect each cell (measured to be ≤86 µT) were reduced by roughly three orders of magnitude by a triply shielded nickel-iron alloy chamber 242. An insulated box 241 was then placed around this chamber to allow for heating to near 36° C.

After the probe beam passed through the cell 233 it was returned to linear polarization and relaunched into an optical fiber where it was combined with the local oscillator beam and sampled using a 1-GHz bandwidth detector 228 with a noise-equivalent power of 31 $pW/Hz^{1/2}$. The detector signal 229 was amplified and then split into two legs; one of which went to a 4 GHz, 8-bit oscilloscope 230 for data acquisition and the other to a phase-locking servo 237. The latter signal 238 was fed back to the voltage-controlled oscillator 234 that drove AOM 225 to allow for long-term coherent averaging by removing phase noise in the laser beam 221 caused by thermal and mechanical fiber fluctuations. The laser wavelength was stabilized with a loop bandwidth of 2 Hz using a high precision wavelength meter with 15 MHz resolution. This servo did not have a large effect on the resulting spectra due to the common-mode nature of the pump and probe beams.

The resulting spectra were then normalized against spectra recorded when the laser was detuned 4 GHz from the relevant absorption features. These normalized transmission spectra (i.e., $I/I_0$) were converted to an intensity-based absorbance scale according to $A=-2 \ln(I/I_0)$, where the factor of 2 accounts for the heterodyne nature of the measurement in which the time-averaged signal intensity is proportional to the product of the field amplitudes of the local oscillator and transmitted probe beams.

Figure 7:
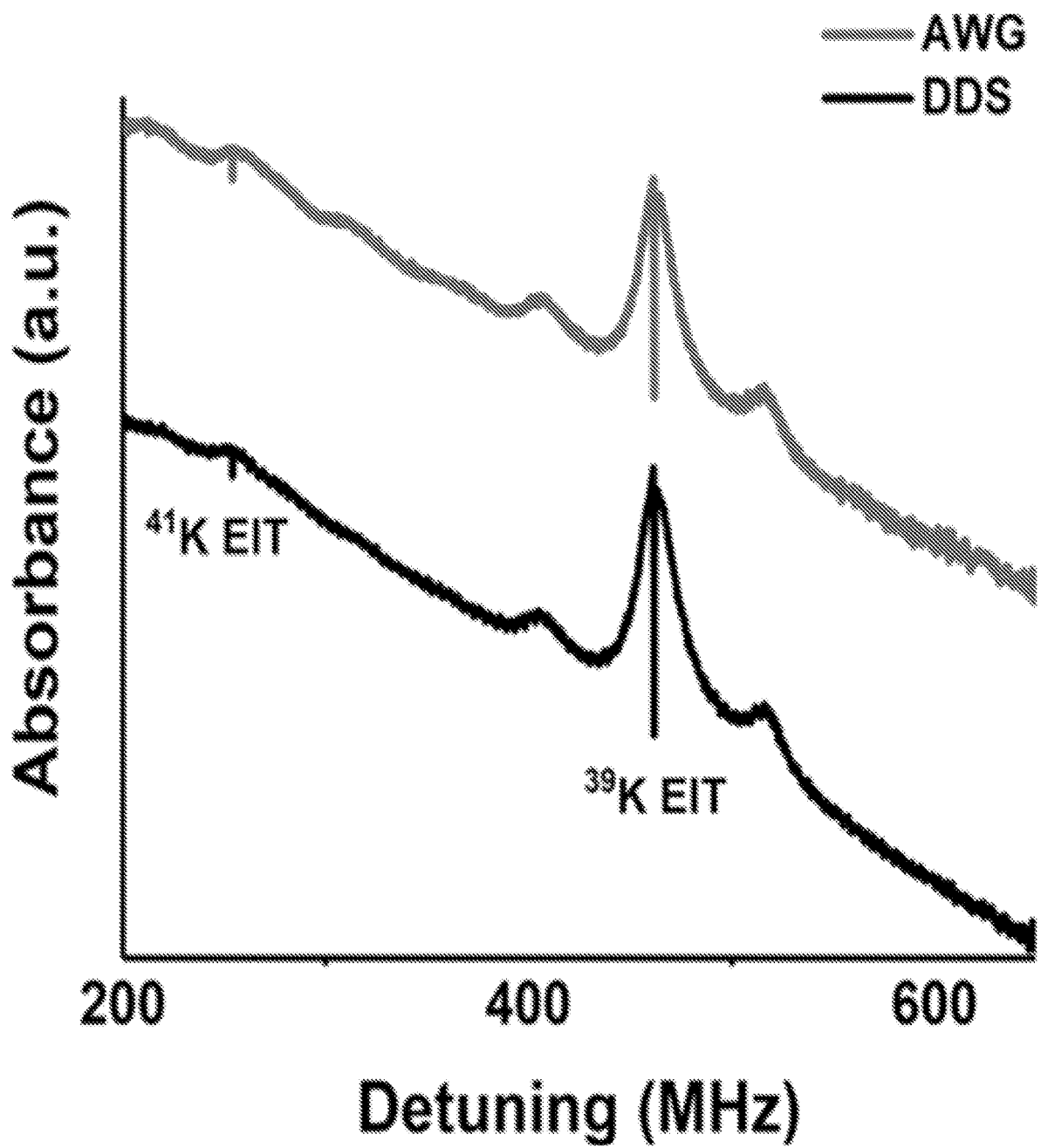
FIG. 7 shows, according to the Example, electromagnetically induced transparency (EIT) and hyperfine pumping spectra for $^{39}K$ and $^{41}K$ D1 transitions in the evacuated gas cell using the arbitrary waveform generator (AWG) and direct digital synthesizer (DOS) for comb generation. The x-axis is given as detuning relative to the carrier. The cell was held near 37° C. and contained potassium at natural isotopic abundance. The spectra were recorded with a comb tooth spacing of 200 kHz. One thousand interferograms were coherently averaged in the time domain before being Fourier transformed and normalized to produce a spectrum. Each interferogram contained $5 \times 10^6$ samples recorded at $5 \times 10^9$ samples per second. Ten of these spectra were then averaged to produce the shown traces.

Chirped optical frequency comb 224 spanning 200 MHz to 650 MHz from the carrier with a comb tooth spacing of 200 kHz (i.e., containing 2 250 positive-order comb teeth) was used to probe the $D_1$ transitions of $^{39}K$ and $^{41}K$ near 770.1 nm (FIG. 7). The unmodulated, carrier frequency of the comb served as the pump (i.e., control) beam to initiate the sub-Doppler spectroscopy. This allows for multiplexed observations of hyperfine pumping and EIT features. Due to the high signal-to-noise ratios, which are enabled via coherent time domain averaging, we are able to also observe the EIT feature for the rare $^{41}K$ isotope in the natural isotopic abundance sample. The resulting spectra recorded when using DDS 213 and AWG are similar, indicating that the normalization efficiently accounts for these variations.

Figure 8:
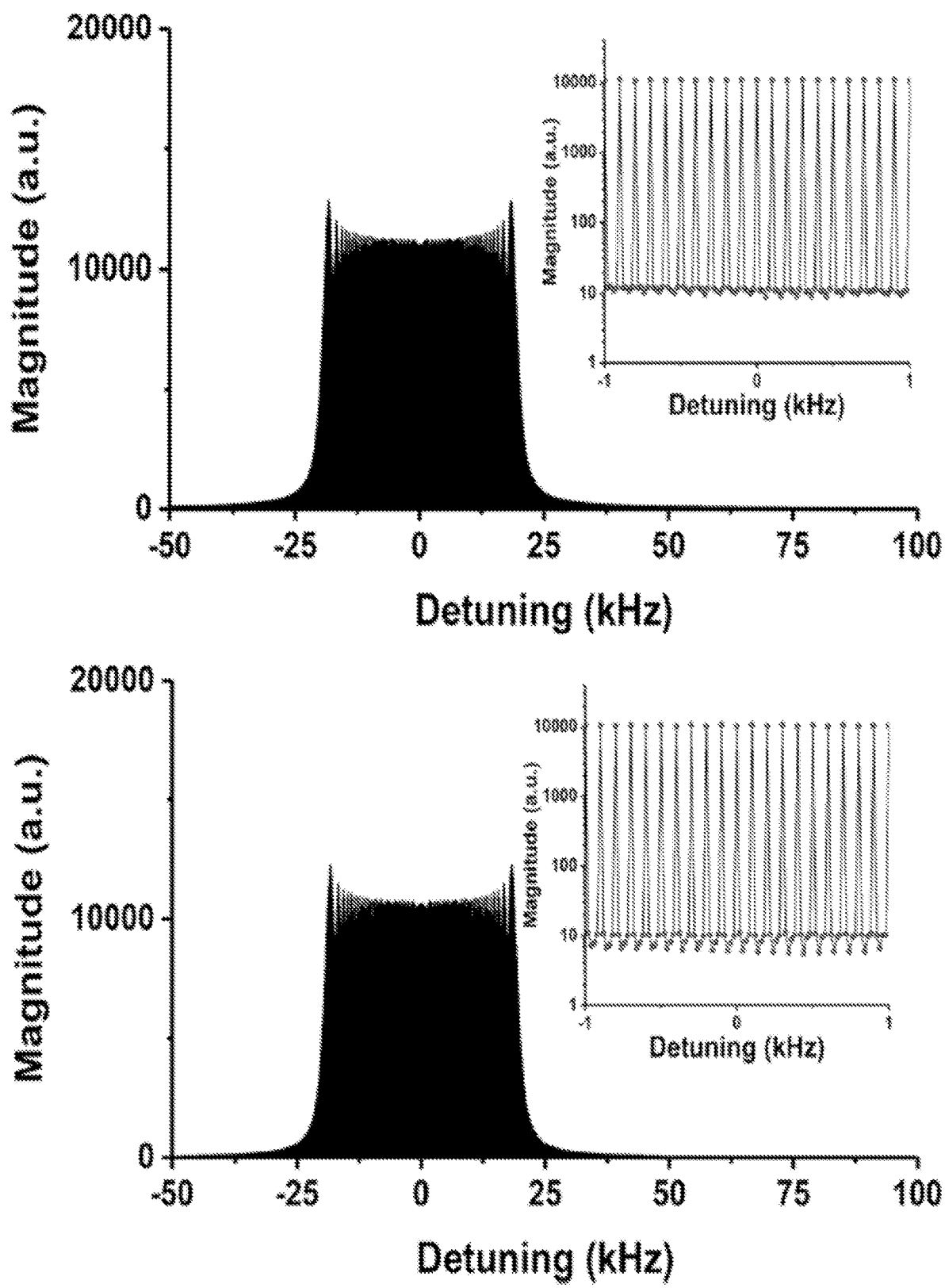
FIG. 8 shows, according to the Example, ultrahigh resolution optical frequency combs containing 400 comb teeth spaced at 100 Hz. The x-axis is given as detuning relative to the center of the frequency comb which is located 461.73 MHz from the carrier. The top comb was generated via direct digital synthesis while the bottom comb was generated with the arbitrary waveform generator. The shown self-heterodyne spectra are the average of five off-resonance frequency domain traces. Each component trace was the magnitude of the Fourier transform of one thousand coherently averaged interferograms which contained $5\times10^7$ samples recorded at $1\times10^9$ samples per second. The inset shows a zoomed-in-view of the optical frequency combs. Note that the comb teeth are resolution bandwidth limited. The relative standard deviation of the magnitudes of the twenty-one comb teeth shown in the inset are 1.2% (direct digital synthesizer, top) and 1.7% (arbitrary waveform generator, bottom).

Due to the digitally controlled nature of the comb repetition rate, comb 224 was produced with tooth spacings as low as 100 Hz using the DDS 213. The resulting ultrahigh resolution frequency combs are shown in FIG. 8. The DDS and AWG lead to almost identical optical frequency combs, with the DDS producing a flatter comb.

Figure 9:
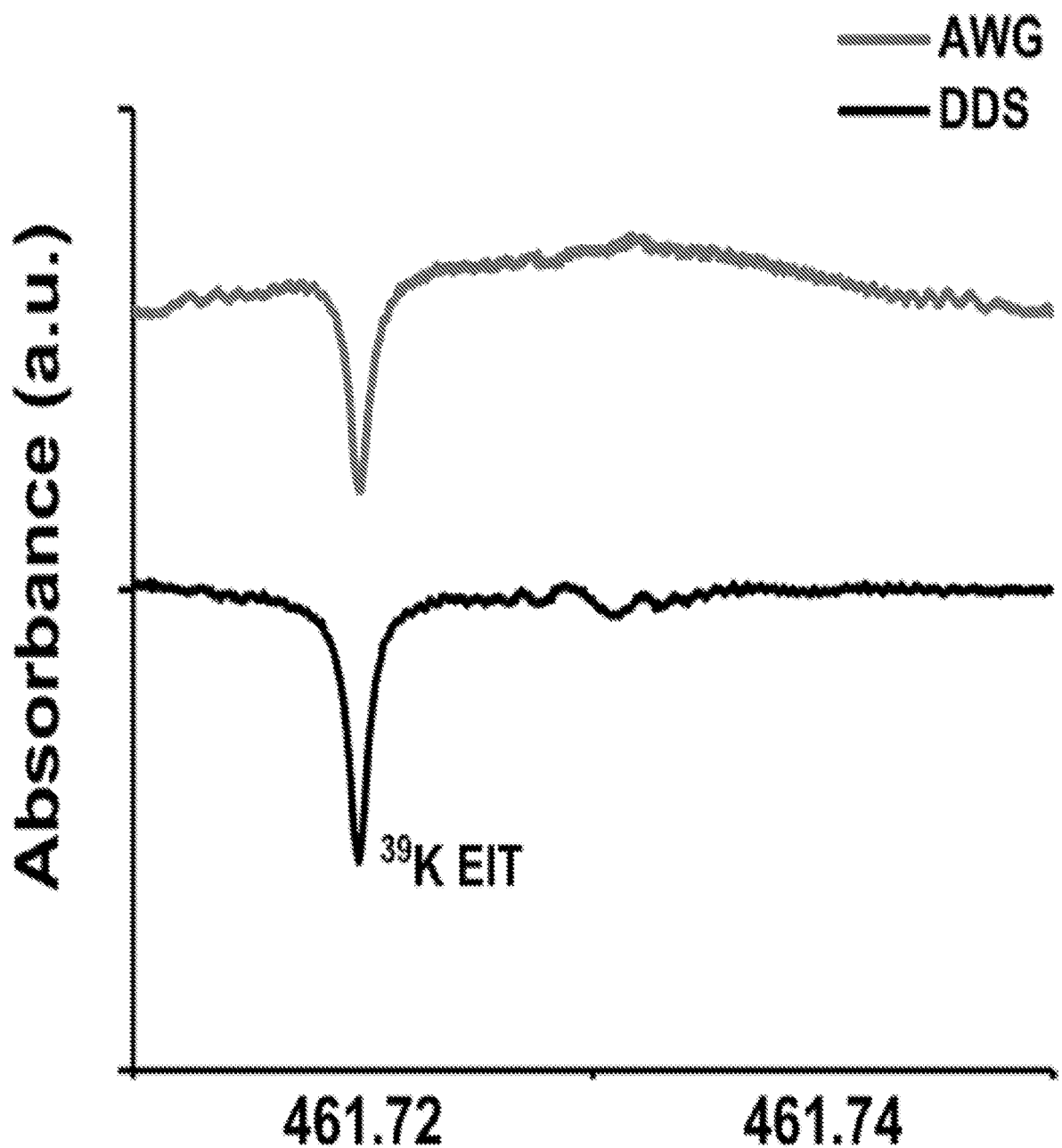
FIG. 9 shows, according to the Example, electromagnetically induced transparency (EIT) spectra for $^{39}K$ D1 transition in the buffer gas cell using the arbitrary waveform generator (AWG) and direct digital synthesizer (DOS) for comb generation. The x-axis is given as detuning relative to the carrier. The DOS trace was shifted down vertically one division for clarity. The cell contained 2.67 kPa of argon buffer gas and was held near 36° C. The shown spectra were recorded with a comb tooth spacing of 100 Hz. One thousand interferograms were coherently averaged in the time domain before being Fourier transformed and normalized to produce a spectrum. Each interferogram contained $5\times10^7$ samples recorded at $1\times10^9$ samples per second. Ten of these spectra were then averaged to produce the shown traces. The differences in the baseline curvature are likely due to temporal variations of the normalization procedure rather than due to inherent differences between the AWG and DDS.

The optical frequency combs were used to probe an EIT feature that was narrower than the laser linewidth (and therefore the comb linewidths). To produce ultranarrow EIT features, a potassium cell with an argon buffer gas was used. The presence of the buffer gas led to a reduction of the transit time broadening and dramatically narrower EIT features. With reference to FIG. 9, the combs resolved an EIT feature with a width of 1.0 kHz. The width was a factor of 50 to 200 narrower than the estimated laser linewidth. This sub-laser-linewidth resolution was obtained by mutual coherence between the pump and probe beams for a significant reduction of the apparent frequency jitter. Ten DDS-based spectra which were averaged to obtain results shown in FIG. 9 that were then individually fit to a Lorentzian with a linear baseline that had a fitted center frequency and standard uncertainty for the EIT feature of 461.71980(8) MHz. The microwave value was 461.7197201(6) MHz at the 1σ level.

The self-heterodyne configuration of electro-optic frequency combs provides multiplexed direct frequency comb spectroscopy with unprecedented resolution. Unlike conventional measurement techniques that use traditional mode-locked-laser-based optical frequency combs, no slow interleaving of combs with relatively coarse tooth spacing is required to achieve high resolution. Further, in comparison to conventional CW laser approaches, the spectra can be recorded in a single shot, thus removing the need for slow spectral scanning. The approach in the Example used high mutual coherence of the pump (control) and probe fields to efficiently prepare and observe in highly resolution dressed states.

The electro-optic frequency comb generation described here overcomes high cost, size, and power consumption of arbitrary waveform generators and provides higher frequency agility. Further, this approach allows for ultra-flat optical frequency combs and coherent time domain averaging, leading to high signal-to-noise ratio spectra which are comparable to that achievable with an arbitrary waveform generator. While the bandwidth of available direct digital synthesizers is lower than that commercially available with high-end arbitrary waveform generators, these type of waveforms can readily be multiplied up to higher frequencies. Further, a variety of techniques can extend the bandwidth of electro-optic frequency combs through nonlinear broadening or cascaded modulators. These attributes make generating a chirped optical frequency comb described here useful for high-precision frequency metrology in atomic and molecular systems as well as distance metrology and communications.

A digital ramp generator (DRG) was used to produce the linear frequency chirps using only a handful of parameters. Although the DDS can be programmed to continuously repeat these ramps based upon internal timing settings, in this configuration the initial phase at the beginning of each chirp is not controlled, and multiple ramps do not coherently average. Thus, the DDS was programmed to start a new ramp with a consistent phase upon receiving a digital trigger on the IOUPDATE pin by setting the "Autoclear digital ramp accumulator" and "Autoclear phase accumulator" flags high. The repetition rate ($f_{rep}$) and comb tooth spacing were controlled by a series of digital triggers generated externally using a digital delay generator. Excess timing jitter on the digital triggers led to noise in the comb spectrum, but a high-quality timing source can be used. Although the nominal clock frequency ($f_{clock}$) was 3.5 GHz, the device can be overclocked up to 4.0 GHz. Since the DRG updates at a rate of $f_{clock}/24$, a clock frequency can be used that satisfies $f_{clock}/24=mf_{rep}$, wherein m is an integer. Violating this condition led to unexpected comb teeth spacing and offsets. The DOS can be programmed to output a trigger that indicated that completion of a frequency ramp, which can optionally be used to trigger data acquisition.

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi threaded processing, interrupt processing, or multiple processors or processor cores on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A direct digital chirp synthesizer for generating a chirped optical frequency comb, the direct digital chirp synthesizer comprising:
   a direct digital synthesizer that receives a repetition frequency signal from a delay generator, receives a clock frequency from a frequency converter, produces a radiofrequency chirp waveform based on the repetition frequency signal and the clock frequency, and communicates the radiofrequency chirp waveform; and
   an electro optic modulator in electrical communication with the direct digital synthesizer and that receives the radiofrequency chirp waveform from the direct digital synthesizer, receives laser light, and produces the chirped optical frequency comb from the laser light based on the radiofrequency chirp waveform.

2. The direct digital chirp synthesizer of claim 1, further comprising the frequency converter in electrical communication with the direct digital synthesizer and that produces the clock frequency and communicates the clock frequency to the direct digital synthesizer.

3. The direct digital chirp synthesizer of claim 1, further comprising the delay generator in electrical communication with the direct digital synthesizer and that produces the repetition frequency signal and communicates the repetition frequency signal.

4. The direct digital chirp synthesizer of claim 3, further comprising a programmer in electrical communication with the delay generator and the direct digital synthesizer, the programmer comprising:
   a microcontroller; and
   a logic gate in electrical communication with the microcontroller and the delay generator,
   wherein:
      the microcontroller receives a configuration signal and produces a program signal and DDS setting data based on the configuration signal,
      wherein the DDS setting data is communicated to and received by the direct digital synthesizer to set operational parameters of the direct digital synthesizer; and
      the logic gate receives the repetition frequency signal from the delay generator and the program signal from the microcontroller, and produces a logic signal that comprises the program signal to program the direct digital synthesizer or the repetition frequency signal to update the direct digital synthesizer, such that the logic signal is communicated to and received by the direct digital synthesizer for producing the radiofrequency chirp waveform.

5. The direct digital chirp synthesizer of claim 4, further comprising a configuration unit in electrical communication with the programmer and that produces the configuration signal and communicates the configuration signal to the microcontroller.

6. The direct digital chirp synthesizer of claim 1, further comprising a signal conditioning module in electrical communication with the direct digital synthesizer and that receives the radiofrequency chirp waveform from the direct digital synthesizer, electrically conditions the radiofrequency chirp waveform, and then communicates the radiofrequency chirp waveform to the electro optic modulator after performing the conditioning.

7. The direct digital chirp synthesizer of claim 6, wherein the signal conditioning module comprises:
   a low pass filter in electrical communication with the direct digital synthesizer that receives the radiofrequency chirp waveform from the direct digital synthesizer, filters the radiofrequency chirp waveform, and produces an intermediate RF chirp waveform from the radiofrequency chirp waveform;
   an amplifier in electrical communication with the low pass filter that receives the intermediate RF chirp waveform from the low pass filter, amplifies the intermediate RF chirp waveform, and produces an amplified intermediate RF chirp waveform from the intermediate RF chirp waveform; and
   a low pass filter in electrical communication with the amplifier that receives the intermediate RF chirp waveform from the amplifier, filters the intermediate RF chirp waveform, produces the radiofrequency chirp waveform from the intermediate RF chirp waveform, and communicates the radiofrequency chirp waveform to the electro optic modulator.

8. A chirped optical frequency comb spectrometer for performing chirped optical spectroscopy, the chirped optical frequency comb spectrometer comprising:
   a direct digital chirp synthesizer that comprises:
      a direct digital synthesizer that receives a repetition frequency signal from a delay generator, receives a clock frequency from a frequency converter, produces a radiofrequency chirp waveform based on the repetition frequency signal and the clock frequency, and communicates the radiofrequency chirp waveform; and
      an electro optic modulator in electrical communication with the direct digital synthesizer and that:
         receives the radiofrequency chirp waveform from the direct digital synthesizer;
         receives laser light; and
         produces a chirped optical frequency comb from the laser light based on the radiofrequency chirp waveform; and
   a spectroscopy cell in optical communication with the electro optic modulator and that receives a frequency shifted optical comb based on the chirped optical frequency comb and produces an optical spectrum from the frequency shifted optical comb.

9. The chirped optical frequency comb spectrometer of claim 8, wherein the direct digital chirp synthesizer further comprises the frequency converter in electrical communication with the direct digital synthesizer and that produces the clock frequency and communicates the clock frequency to the direct digital synthesizer.

10. The chirped optical frequency comb spectrometer of claim 8, further comprising the delay generator in electrical communication with the direct digital synthesizer and that produces the repetition frequency signal and communicates the repetition frequency signal to the direct digital synthesizer.

11. The chirped optical frequency comb spectrometer of claim 10, further comprising a programmer in electrical communication with the delay generator and the direct digital synthesizer, the programmer comprising:

a microcontroller, and
a logic gate in electrical communication with the microcontroller and the delay generator,
wherein:
the microcontroller receives a configuration signal and produces a program signal and DDS setting data based on the configuration signal, wherein the DDS setting data is communicated to and received by the direct digital synthesizer to set operational parameters of the direct digital synthesizer; and
the logic gate receives the repetition frequency signal from the delay generator and the program signal from the microcontroller, and produces a logic signal that comprises the program signal to program the direct digital synthesizer or the repetition frequency signal to update the direct digital synthesizer, such that the logic signal is communicated to and received by the direct digital synthesizer for producing the radiofrequency chirp waveform.

12. The chirped optical frequency comb spectrometer of claim 11, further comprising a configuration unit in electrical communication with the programmer and that produces the configuration signal and communicates the configuration signal to the microcontroller.

13. The chirped optical frequency comb spectrometer of claim 8, further comprising a signal conditioning module in electrical communication with the direct digital synthesizer and that receives the radiofrequency chirp waveform from the direct digital synthesizer, electrically conditions the radiofrequency chirp waveform, and then communicates the radiofrequency chirp waveform to the electro optic modulator after performing the conditioning.

14. The chirped optical frequency comb spectrometer of claim 13, wherein the signal conditioning module comprises:
a low pass filter in electrical communication with the direct digital synthesizer that receives the radiofrequency chirp waveform from the direct digital synthesizer, filters the radiofrequency chirp waveform, and produces an intermediate RF chirp waveform from the radiofrequency chirp waveform;
an amplifier in electrical communication with the low pass filter that receives the intermediate RF chirp waveform from the low pass filter, amplifies the intermediate RF chirp waveform, and produces an amplified intermediate RF chirp waveform from the intermediate RF chirp waveform; and
a low pass filter in electrical communication with the amplifier that receives the intermediate RF chirp waveform from the amplifier, filters the intermediate RF chirp waveform, produces the radiofrequency chirp waveform from the intermediate RF chirp waveform, and communicates the radiofrequency chirp waveform to the electro optic modulator.

15. The chirped optical frequency comb spectrometer of claim 8, further comprising the laser in optical communication with the electro optic modulator and that produces the laser light, communicates the laser light that is received by the electro optic modulator.

16. The chirped optical frequency comb spectrometer of claim 15, further comprising:
a local oscillator leg in optical communication with the laser and that receives the laser light from the laser and communicates the laser light to a heterodyne detector; and
the heterodyne detector in optical communication with the spectroscopy cell and the local oscillator leg and that:
receives the laser light from the local oscillator leg;
receives the optical spectrum from the spectroscopy cell; and
produces a radiofrequency interferogram from the laser light and the optical spectrum.

17. The chirped optical frequency comb spectrometer of claim 15, further comprising:
a phase frequency detector in communication with the heterodyne detector and that receives the radiofrequency interferogram from the heterodyne detector, produces a phase drift control signal from the radiofrequency interferogram, and communicates the phase drift control signal to a voltage controlled oscillator;
the voltage controlled oscillator in communication with the phase frequency detector and that receives the phase drift control signal from the radiofrequency interferogram, produces a drive frequency from the phase drift control signal, and communicates the drive frequency to an acousto optical modulator; and
the acousto optical modulator in communication with the voltage controlled oscillator, the electro optic modulator, and the spectroscopy cell and that receives the drive frequency from the voltage controlled oscillator, receives the chirped optical frequency comb from the electro optic modulator, produces the frequency shifted optical comb from the chirped optical frequency comb based on the drive frequency, and communicates the frequency shifted optical comb to the spectroscopy cell.

18. The chirped optical frequency comb spectrometer of claim 15, further comprising a magnetic shielding in which the spectroscopy cell is disposed and that shields the spectroscopy cell from electromagnetic interference.

19. A process for generating a chirped optical frequency comb with a direct digital chirp synthesizer, the process comprising:
receiving, by a direct digital synthesizer, a repetition frequency signal from a delay generator;
receiving, by the direct digital synthesizer, a clock frequency from a frequency converter;
producing, by the direct digital synthesizer, a radiofrequency chirp waveform based on the repetition frequency signal and the clock frequency;
communicating the radiofrequency chirp waveform from the direct digital synthesizer;
receiving, by an electro optic modulator, the radiofrequency chirp waveform from the direct digital synthesizer;
receiving, by the electro optic modulator, laser light; and
producing, by the electro optic modulator, the chirped optical frequency comb from the laser light based on the radiofrequency chirp waveform.

20. The process of claim 19, further comprising:
producing, by the frequency converter, the clock frequency;
communicating the clock frequency from the frequency converter to the direct digital synthesizer;
producing, by the delay generator, the repetition frequency signal;
communicating the repetition frequency signal from the delay generator;
receiving, by a microcontroller, a configuration signal and producing a program signal and DDS setting data based on the configuration signal, and communicating the DDS setting data to the direct digital synthesizer;
setting operational parameters of the direct digital synthesizer based on the DDS setting data;

receiving, by a logic gate, the repetition frequency signal from the delay generator and the program signal from the microcontroller, and producing a logic signal that comprises the program signal or the repetition frequency signal;
programming the direct digital synthesizer with the program signal;
updating the direct digital synthesizer with the repetition frequency signal;
producing, by a configuration unit, a configuration signal, communicating the configuration signal to the microcontroller from the configuration unit, and configuring the microcontroller with the configuration signal; and
producing the radiofrequency chirp waveform by the direct digital synthesizer.

* * * * *